May 22, 1951
C. F. GEIGER
2,553,759
METHOD FOR MAKING REFRACTORY
BODIES AND PRODUCT THEREOF
Filed Feb. 20, 1946
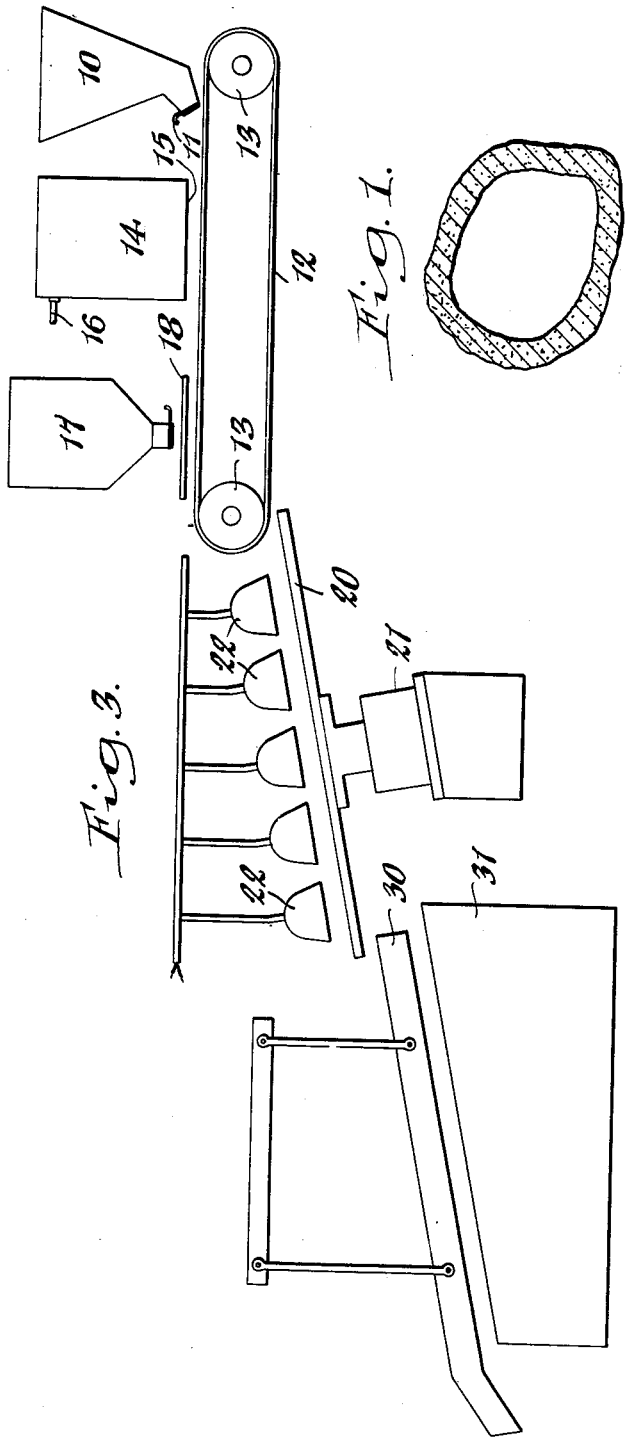
INVENTOR.
CHARLES F. GEIGER
BY
Attorney Patented May 22, 1951

2,553,759

UNITED STATES PATENT OFFICE 2,553,759

METHOD FOR MAKING REFRACTORY BODIES AND PRODUCT THEREOF

Charles F. Geiger, Metuchen, N. J., assignor to The Carborundum Company, Niagara Falls, N. Y., a corporation of Delaware Application February 20, 1946, Serial No. 649,002

21 Claims. (Cl. 25—156)

This application relates to improved high temperature insulating refractories and to pore-containing bodies or hollow spheroids useful in forming such refractories or for use as porous aggregates.

Heretofore some insulating refractories have been formed of porous grog or of hollow globules or bubbles of alumina held together by a suitable bond. Porous grog refractories have not been wholly satisfactory since they do not have the necessary refractoriness for many uses at extremely high temperatures. On the other hand, alumina has comparatively high heat conductivity as compared with certain other refractory materials, for example, mullite, and is therefore somewhat lacking in insulating properties. Unsuccessful attempts have been made to obtain mullite, spinel, forsterite, and a number of other refractories of comparatively low heat conductivity in the form of bubbles like those obtained from molten alumina by impinging upon a stream thereof with a jet of air. Instead of producing bubbles, pellets are formed which are more or less cellular in structure. These pellets are of no great value in the manufacture of insulating refractories because of the low percentage of voids in refractories made therefrom and their greater weight.

It is an object of the present invention to provide hollow, substantially spherical pellets of materials, such as mullite, which do not form hollow spheres by simple air blowing as does alumina, and to provide light weight, highly efficient, cellular, insulating refractories utilizing such hollow spheroids. Other objects will be apparent from the following description.

In the accompanying drawings, Figures 1 and 2 are enlarged representations in cross section of hollow refractory spheroids made in accordance with my invention. Figure 3 is a diagrammatic illustration of apparatus which may be used in producing the hollow pellets of my invention. Figure 4 is an enlarged view, partly in section, of an insulating refractory article constructed in accordance with my invention; and Figure 5 is an enlarged view partly in section of another type of insulating refractory article in accordance with my invention.

In accordance with my invention hollow, substantially spherical pellets may be produced by coating small globules of combustible materials with the finely-divided refractory material from which it is desired to make the pellets. The coating of the combustible globules with finely-divided refractory material may be accomplished in a number of ways as, for example, by agitating or tumbling the wet or sticky globules in the finely-divided refractory material. Subsequently the combustible material is burned out leaving a hollow spheroid which with proper heat treatment has considerable strength and excellent insulating properties when formed into refractory shapes.

Depending upon the kind of adhesive employed and the other combustible ingredients, if such are used, mixed with it as well as upon the manner of drying and firing the coated globules, the hollow pellets formed may be substantially entirely closed as illustrated in the enlarged sectional view of a typical pellet shown in Figure 1 or they may have small holes in their walls which probably result from too rapid an evolution of gases during the firing. An enlarged view of a cross section of an imperfect hollow spheroid of this type is shown in Figure 2.

While the vented hollow spheroids mentioned above are not quite as desirable as those having no vents or openings in the wall, they are useful in making porous refractories. Usually where so-called dry mixing methods are employed, only a small and unimportant percentage of the bonding material is lost within the hollow globules. If it is desired, the hollow pellets having openings in their walls may be pre-mixed with inexpensive combustible materials such as, for example, flour and starch in the form of a slip to fill up the interior of the hollow pellets. Thus, when the final refractory mixture is being pressed, the bond is prevented from penetrating to the inside of the hollow spheroids.

A convenient and efficient method of producing the hollow pellets of my invention is by the use of apparatus such as that shown diagrammatically in Figure 3 of the drawings. In that apparatus, finely-divided refractory material is fed from hopper 10 through adjustable gate 11 onto conveying means such as endless belt 12. Belt 12, which is supported by rollers 13, conveys the finely-divided refractory material beneath tank 14 in which is contained preferably a viscous solution and/or liquid suspension of a combustible adhesive material such as, for example, the adhesive derived from sulfite residues sold under the trade name "Lignone." This material is quite soluble in water and consists primarily of calcium and magnesium ligno-sulphonates with some complex sugars and residues of pulp cooking chemicals and other minor impurities. Non-combustible material amounts to from 5 to 10% of the solid material. A viscous solution in water would be one containing at least 50% of solid material.

Tank 14 is equipped with a perforated bottom 15, the perforations (not shown) being of various sizes. Consequently the adhesive solution or suspension flowing through the perforations of tank bottom 15 forms a range of sizes of globules which fall onto the refractory material carried by belt 12. If necessary, pressure may be applied to tank 14 through inlet pipe 16 to aid or increase the flow of the adhesive through the perforations. It is obvious that the production of globules of a particular size range will depend upon not only the size of the perforations (which, as stated above, are not uniform) but also upon a number of other factors which include the surface tension and viscosity of the adhesive material, the atmospheric temperature and humidity, and the pressure, if any, used. With this number of variables it is most convenient to have the holes in tank bottom 15 of some arbitrary range of small sizes and to vary one or more of the other factors mentioned above to produce globules of the required size range. Belt 12 carrying the refractory material and the globules of adhesive then passes under hopper 17 from which additional finely-divided refractory material is spread over the globules by suitable means such as vibrating screen 18, thus covering the surface of the globules with the refractory material.

Passing off the end of belt 12 the refractory material and the globules, which are as yet imperfectly coated therewith, fall onto agitating means, such as table 20 which is subjected to vibration by electromagnetic vibrator 21 or other convenient means. The vibration of the globules in the mass of refractory material results in the building up thereon of a coating of the finely-divided refractory material of substantial thickness. The coated globules may also be dried while on vibrating table 20 by the use of suitable heating means such as infra-red heat lamps 22 suspended in close proximity to table 20.

The mixture of coated globules and unused finely-divided refractory material which passes off the lower end of vibrating table 20 falls onto a vibrating screen 30 of such mesh size that the coated globules are retained on the screen while the excess fine refractory material passes through, falling into bin 31 from which it may be returned to hoppers 10 and 17.

The dried globules coated with refractory material which are thus separated from the excess of the latter are removed from vibrating screen 30 and fired under oxidizing conditions to a temperature sufficient not only to burn out the combustible material from the interior but also sufficient to cause any desirable degree of sintering of the refractory material and leave substantially spherical, refractory, hollow pellets. If desired or necessary, the hollow spheroids may then be re-fired to increase their strength. Satisfactory results in burning or firing the spheroids may be obtained by placing the dried coated globules in saggers and carrying out the firing in tunnel or periodic kilns.

It will be realized of course that the precise construction illustrated for the apparatus and the method described above in connection therewith need not be followed exactly but may be varied to a considerable extent as is found convenient. Thus, other types of feeding devices for the finely-divided refractory material and the combustible adhesive solution or suspension may be employed. For feeding the refractory material, for example, devices of the types described in U. S. Patent No. 2,346,743 to C. F. Geiger et al. are well suited. Furthermore, the globules may be dried in a separate operation or by means of other types of drying equipment, and other methods of separating the coated globules from the excess refractory material and of burning out the combustible cores from the spheroids may be employed. As an example of such modification, drying of the coated globules and the screening off of the excess refractory material might be achieved simultaneously by passing the coated globules coming from table 20 into a rotary screen (not shown) through which heated air is blown.

The combustible cores of the globules may be, as hitherto described, of a viscous solution such, for example, as a "filled" Lignone solution formed by incorporating dry Lignone into a concentrated solution thereof. Other combustible adhesive materials such as dextrose, starch, resins and the like may also be used and suspensions of finely-divided combustible substances such as wood flour, nut shells, sugar cane pith and the like in the Lignone or other adhesive solution may be employed.

The size of the combustible adhesive cores is so chosen that the coated globules formed by building up a layer around the core, ranging in thickness from about 5 to 30 thousandths of an inch, of finely-divided refractory material may be in the size range desired. For most purposes the wall thickness of the hollow refractory spheroids resulting from firing the coated adhesive globules may be from about 8 to 20 thousandths of an inch. The screen analysis of the fired spheroids may be of any desired range to suit the requirements of the finished bonded refractory shapes to be manufactured as to porosity, permeability, weight, thermal capacity and other properties wanted in any specific refractory installation. In general such analysis will show from 60 to 90% retained on a 40 mesh screen, from 0-30% through a 40 mesh screen and held on a 100 mesh screen, and from 1-10% passing through a 100 mesh screen. About 1% may be held on a 5 mesh screen and for many purposes at least 25% should pass through a 28 mesh screen.

The refractory material to be coated on the combustible adhesive core should in general be finely divided but the particle size thereof may vary depending upon the wall thickness and the size of the hollow spheroid which it is desired to make. For most purposes a particle size larger than that passing through a screen having about 60 meshes per linear inch is not desirable and it is usually desirable to have the material pass through a 100, 200 or even a 300 mesh screen. In some cases, however, refractory material containing a substantial number of particles as coarse as 30 mesh may be employed. In the two preceding paragraphs the screens described are U. S. standard screens as specified by the U. S. Bureau of Standards.

Satisfactory hollow spheroids may be made in accordance with the present invention from practically any refractory material. Especially good results may be obtained with mullite, kyanite, alumina, forsterite, clay or kaolin grog, or clay itself. Indeed any refractory material which can economically be reduced to a finely-divided condition or is availabe in that form is adapted for use in producing hollow spheroids according to the present invention. Where the finely-divided refractory material is one which is self-bonding only at high temperatures it will on occasion be desired to obtain hollow spheroids without firing to such high temperatures. This may be accomplished by admixing with the finely-divided refractory material small amounts of bonding materials, such, for example, as clay, which will fuse or soften at lower temperatures and thus bond together the finely-divided refractory material which makes up the major portion of the walls of the hollow spheroids. The hollow spheroids made in this manner will be suited for many uses and can be employed except in those uses where extreme refractoriness is required.

The hollow spheroids of this invention are adapted for the making of shaped refractory articles by sintering, in which case the hollow spheroids are pressed together with a temporary bond which is volatilized or burned out during firing and then heated to a temperature which results in the sintering together of the spheres to form a light, porous, refractory article, the refractory properties of which are dependent upon the material used. Bonded refractory articles may also be made employing the hollow refractory spheroids of the present invention in accordance with the following example:

*Example I*

| | Parts by weight |
|---|---|
| Hollow refractory spheroids | 75 |
| Kaolin | 25 |
| Dry Lignone | 2 |
| Water | 7 |

These ingredients are mixed, pressed to shape, dried and then fired to form insulating refractories of very desirable properties. If it is desired to make slip cast articles a more fluid mixture is employed and the Lignone is omitted. In Figure 4 is shown an enlarged representation in cross-section of a refractory article of the type produced in accordance with Example I.

If desirable the dried coated globules may be formed into shapes by the above or other appropriate methods before the combustible cores have been burned out. The cores may then be oxidized and thus removed during the firing or vitrifying of the shaped article.

In the following examples, II and III, are given other mixes for the manufacture of refractory bodies from the hollow refractory spheroids of the present invention. From the mixes therein set forth, articles may be produced which are lighter in weight than those produced by the procedure set forth in Example I. As will be noted in both Example II and Example III, the amount of water used is not exactly specified since the proportion used may be varied somewhat depending upon whether the mixes are to be formed into bodies by dry pressing or by semi-dry pressing.

*Example II*

| | Parts by weight |
|---|---|
| Hollow refractory spheroids | 85 |
| Kaolin | 15 |
| Cereal flour | 12 |
| Sodium silicate | 6 |
| Water | 6± |

*Example III*

| | Parts by weight |
|---|---|
| Hollow refractory spheroids | 85 |
| Kaolin | 15 |
| Cereal flour | 8 |
| Dextrin | 2 |
| Water | 9± |

In both of Examples II and III the refractory shapes after pressing are dried and subsequently fired, the firing temperature depending, of course, upon the mix used, the nature of the refractory spheroids and the purpose for which the refractory shape is intended.

In Examples II and III above, the use of cereal flour causes the production of articles which are lighter in weight than those produced by the procedure described in connection with Example I. During the firing of the refractory shapes formed from the mixes set forth in Examples II and III, the cereal flour is of course burned out with the result that the bond for the hollow refractory spheroids is itself made porous thus increasing the insulating value and lowering the density thereof. Instead of cereal flour, it is of course possible to use a number of other finely-divided materials among them being wood flour, carbon, nut shells, pitch, or the like. Of course a higher percentage of finely-divided burn-out material of this character will give an increased porosity and even lower density to the articles produced by this method. Another method which also will be found quite satisfactory in producing insulating refractory articles of low density is as follows:

*Example IV*

A slip casting mixture of the following composition is made:

| | Parts by weight |
|---|---|
| Hollow refractory spheroids | 75 |
| Kaolin | 25 |
| Dextrin | 0.5 |
| Water | 29.5 |
| Foam | As required |

The foam, made by mixing water and saponin in the proportions of one liter of water to thirty grams of saponin, is added to the mix until the slip attains the desired specific gravity. The slip may then be cast and the cast shapes, after drying, may be fired to mature the bond.

There have been given above four examples of the bonding of hollow refractory spheroids made in accordance with the present invention and the formation of insulating refractory articles. It will, of course, be understood that the bonding material employed may vary considerably in accordance with the nature of the refractory material from which the spheroids are made and the use to which the refractory articles are to be put. For example, it will often be desirable to have the bond used with the hollow spheroids of a composition similar to or identical with that of the spheroids. Thus, in bonding hollow mullite spheroids it is possible to use bonding materials containing silica and alumina in such proportions as to form mullite under the maturing conditions. It is also feasible to include in the insulating refractory broken or crushed hollow spheroids of the same or different composition to produce a desired density, permeability or other property or characteristic.

The proportion of refractory spheroids in the bonded articles may of course be varied within comparatively wide limits, an appreciable amount of insulating value being obtained with as little as 40% by weight of spheroids. In bonded articles as much as 90% by weight of the article may consist of hollow refractory spheroids, while, of course, in articles bonded by sintering no permanent bond need be employed although a small amount may be used if desired. In general, the greater the proportion of spheroids the higher is the insulating value and the lower the density of the refractory article. Since, however, with increasing proportions of spheroids the strength of the article becomes somewhat less, full consideration must be given to the intended use of the refractory article in reaching a balance between strength, insulating properties and weight.

Insulating refractories can also be made according to the present invention by taking the undried coated globules formed by coating cores of combustible adhesive materials with finely-divided refractory material and pressing the still soft, wet, or damp coated globules into the desired shape. Upon firing, the combustible cores are burned out leaving a very porous refractory article. The insulating refractory shapes formed by this method are unusual and valuable since by this method of forming many of the coated globules are deformed during pressing in such manner as to cause many of the pores resulting from the combustion of the core material to be somewhat flattened along a plane normal to the direction in which the molding pressure is applied. The result of this flattening is an insulating refractory in which the total temperature drop from one of its faces to the opposite face is greater than would normally be obtained because of the greater number of temperature "surface-drops" resulting from the larger number of pore walls therebetween.

A suitable bond may be employed with the coated globules in carrying out the method described in the preceding paragraph but it is generally found that satisfactory bonding may be obtained without much, if any, additional bonding material, the refractory material sintering together sufficiently to give articles of the necessary strength. An enlarged cross-sectional view of a refractory formed by this method is shown in Figure 5.

By the present invention it is possible to make lightweight, porous, refractory articles which possess great value and utility for the hot side insulation of very high temperature furnaces and kilns. Serving as the internal lining of such equipment they have the properties of extreme refractoriness, relatively low thermal conductivity, and comparatively low thermal capacity. While high temperature insulating refractories using alumina bubbles of the fused type referred to in the first part of this specification have given satisfactory service in such installations, alumina is not the ideal material for such refractories because of its relatively high thermal conductivity and spalling tendency. Refractories made according to the present invention of hollow mullite spheroids will, because of the low thermal conductivity and decreased tendency of mullite to spall, be even more satisfactory.

The hollow refractory spheroids produced in accordance with the invention of this application may be employed in making other types of valuable insulating materials in addition to those already described. For example, the hollow globules may be mixed with calcium aluminate or other hydraulic cement to produce castable insulating materials. These castable mixes may be formed in place or may, if desired, be formed and pre-fired before being installed in the furnace or other place of use. Furthermore, the hollow globules may be mixed with air-setting cements or bonds and formed into insulating shapes, or structures which may be either pre-fired or cast in place. An example of a composition for an insulating structure of the latter type is as follows:

*Example V*

| | Parts by weight |
|---|---|
| Hollow refractory spheroids | 55 |
| Refractory clay | 25 |
| Sodium silicate | 20 |

In the foregoing description and the accompanying claims it will be understood that the terms "spheroid" and "spherical" are used somewhat loosely since of course many of the hollow pellets formed are not entirely regular in form and are thus not spheroidal or spherical in the strictest sense. However, the general tendency of the hollow pellets formed in accordance with the invention of the present application is toward the assumption of a substantially spherical shape.

It will be apparent from the foregoing description that the hollow refractory spheroids of the invention may be formed by either bonding or sintering procedures. As a result, the walls of these hollow spheroids may be either somewhat porous or quite impervious. Thus is provided a way of varying the structure of the hollow spheroids from that of the fused, blown globules previously known, in which the walls must be substantially impervious. The porous wall of the hollow refractory spheroids of the present invention is, in itself, a better insulator than is an impervious wall of the same material because of the discontinuous nature of the material in the wall itself. Consequently, this invention permits the production of materials and products having better thermal insulating properties than those heretofore produced.

In the specification and claims wherever reference is made to a bonded mullite or other bonded refractory material in hollow, spherical pellet form it is intended to cover a hollow spherical pellet the walls of which have been formed by the herein-described process of coating a sticky spherical globule of combustible material with powdered or granular refractory material, such as mullite, and drying and firing the coated globule to burn out the combustible core material and bond the refractory particles of the coating by sintering the particles together. Such reference is not intended to include a hollow spherical pellet obtained by fusing a refractory material to molten form and blowing the molten material to form hollow spheres the walls of which are of fused monolithic material.

It will be obvious from the foregoing description that this invention is of broad scope and that many variations and modifications of the processes herein set forth may be made without departing from the spirit of the invention. Accordingly it is desired that the invention shall not be restricted to the modifications described in detail but shall only be restricted by the scope of the appended claims.

I claim:

1. The process of forming light weight, cellular, insulating refractory bodies which comprises producing hollow, substantially spherical refractory pellets by coating finely-divided refractory material as a thin shell on a substantially spherical sticky globule of combustible material, burning out said combustible material and sintering together the finely-divided particles of refractory material in the shell; forming a shaped body from a plurality of said hollow pellets with a small amount of vitrifiable ceramic bonding material; and firing said body to mature it.

2. The process of forming light weight, cellular, insulating refractory bodies which comprises producing hollow, substantially spherical refractory pellets by coating finely-divided refractory material as a shell on a substantially spherical sticky globule of combustible material, burning out said combustible material and sintering together the finely-divided particles of refractory material in the shell; forming a shaped body from a plurality of said hollow pellets with a small amount of bonding material, and firing said body to mature it.

3. The process as set forth in claim 2 in which the refractory material is mullite.

4. The method of forming light weight, cellular, insulating refractory bodies which comprises coating substantially spherical sticky globules of combustible material with a thin shell formed of finely-divided refractory material, firing said coated globules in such manner as to burn out the combustible material and sinter together, without substantial loss of form, the particles of refractory material, molding the sintered hollow shells with a small amount of vitrifiable ceramic bonding material into the desired shape, and firing the shaped article.

5. The method of forming light weight, cellular, insulating refractory bodies which comprises coating substantially spherical sticky globules of combustible material with a shell formed of finely-divided refractory material, firing said coated globules in such manner as to burn out the combustible material and sinter together, without substantial loss of form, the particles of refractory material, molding the sintered hollow shells with a small amount of bonding material into the desired shape and firing the shaped article.

6. The method as set forth in claim 5 in which the refractory material is mullite.

7. The method of producing light weight, cellular, insulating refractory bodies which comprises forming a thin coating of finely-divided refractory material on substantially spherical sticky globules of combustible material, molding a body from a plurality of said coated globules, and firing said body to burn out said combustible material and to sinter together the particles of finely-divided refractory material whereby there is produced an insulating refractory having interspersed pores.

8. The method of producing light weight, cellular, insulating refractory bodies which comprises forming a coating comprising finely-divided refractory material on substantially spherical sticky globules of combustible material, forming a body from a plurality of said coated globules, firing said body to burn out said combustible material and to bond together the particles of finely-divided refractory material whereby there is produced an insulating refractory having interspersed pores.

9. The method as set forth in claim 8 wherein the refractory material is mullite.

10. The method of making hollow, substantially spherical, refractory pellets which comprises coating sticky globules of combustible material with a thin shell of finely-divided refractory material and firing said coated globules whereby the combustible material is burned out and the refractory material in the shell is sintered while retaining its form.

11. The method of making hollow, substantially spherical, refractory pellets which comprises coating sticky globules of combustible material with a shell of finely-divided refractory material and firing said coated globules to burn out the combustible material and sinter, in the form of a hollow pellet, the refractory material in the shell.

12. The method as set forth in claim 11 wherein the refractory material is mullite.

13. A light weight, cellular, insulating refractory body comprising hollow, substantially spherical pellets of bonded mullite, the walls of said pellets being of the order of magnitude of from about 5 to 30 thousandths of an inch in thickness, and substantially all of said pellets being of a size which will pass through a 5 mesh screen.

14. A light weight, cellular, insulating refractory body composed of hollow, substantially spherical pellets of bonded mullite and a vitrified ceramic bond therefor, the walls of said pellets being of the order of magnitude of from about 5 to 30 thousandths of an inch in thickness, and substantially all of said pellets being of a size which will pass through a 5 mesh screen.

15. A light weight, cellular, insulating refractory body composed of hollow, substantially spherical pellets of bonded mullite and a bond of calcium aluminate hydraulic cement therefor, the walls of said pellets being of the order of magnitude of from about 5 to 30 thousandths of an inch in thickness, and substantially all of said pellets being of a size which will pass through a 5 mesh screen.

16. A light weight, cellular, insulating refractory body composed of hollow, substantially spherical pellets of bonded mullite and a bond therefor, said bond comprising the reaction products of a refractory clay and sodium silicate, the walls of said pellets being of the order of magnitude of from about 5 to 30 thousandths of an inch in thickness, and substantially all of said pellets being of a size which will pass through a 5 mesh screen.

17. A light weight, cellular, insulating refractory body composed of hollow, substantially spherical, bonded refractory pellets and a bond therefor, the walls of said pellets being of the order of magnitude of from about 5 to 30 thousandths of an inch in thickness, and substantially all of said pellets being of a size which will pass through a 5 mesh screen.

18. As a new article of manufacture, substantially spherical, hollow refractory pellets, the walls of which are composed of bonded particles of refractory material, the walls of said pellets being of the order of magnitude of from about 5 to 30 thousandths of an inch in thickness, and substantially all of said pellets being of a size which will pass through a 5 mesh screen.

19. A hollow, substantially spherical refractory pellet, as described in claim 18, in which the refractory material is mullite.

20. A light weight, cellular, insulating refractory body consisting essentially of hollow, substantially spherical pellets having walls formed of a bonded refractory material, and a ceramic bond therefor, the walls of said pellets being of the order of magnitude of from about 5 to 30 thousandths of an inch in thickness, and substantially all of said pellets being of a size which will pass through a 5 mesh screen.

21. A fired, light weight, cellular, insulating refractory body comprising hollow, flattened refractory pellets of bonded mullite, the walls of said pellets being of the order of magnitude of from about 5 to 30 thousandths of an inch in thickness, and substantially all of said pellets being of a size which will pass through a 5 mesh screen.

CHARLES F. GEIGER.

REFERENCES CITED

The following references are of record in the file of this patent:

UNITED STATES PATENTS

| Number | Name | Date |
|---|---|---|
| 868,762 | Crow | Oct. 22, 1907 |
| 874,167 | Crow | Dec. 17, 1917 |
| 1,344,324 | Walter | June 22, 1920 |
| 1,623,989 | Wikkula | Apr. 12, 1927 |
| 1,682,675 | Horsfield | Aug. 28, 1928 |
| 1,824,240 | Smith | Sept. 22, 1931 |
| 1,934,383 | Stafford | Nov. 7, 1933 |
| 2,015,381 | Harding | Sept. 24, 1935 |
| 2,041,088 | Pfirrmann | May 19, 1936 |
| 2,136,096 | Benner et al. | Nov. 8, 1938 |
| 2,199,046 | Evenstad | Apr. 30, 1940 |
| 2,339,003 | De Boer et al. | Jan. 11, 1944 |
| 2,340,194 | McMullen | Jan. 25, 1944 |
| 2,384,944 | Marisic | Sept. 18, 1945 |
| 2,408,986 | Marisic et al. | Oct. 8, 1946 |